United States Patent [19]

Shimogawa et al.

[11] 4,385,775
[45] May 31, 1983

[54] SEAT BELT TENSIONING DEVICE FOR VEHICLE

[75] Inventors: Toshiaki Shimogawa; Satosi Kuwakado, both of Aichi; Noboru Tsuge; Toshihiro Takei, both of Kariya, all of Japan

[73] Assignee: Nippon Soken, Inc., Nishio, Japan

[21] Appl. No.: 202,435

[22] Filed: Oct. 30, 1980

Related U.S. Application Data

[63] Continuation-in-part of Ser. No. 20,045, Mar. 13, 1979, Pat. No. 4,232,886.

[30] Foreign Application Priority Data

Nov. 10, 1979 [JP] Japan .............................. 54-145833

[51] Int. Cl.³ .............................................. B60R 21/10
[52] U.S. Cl. .................................... 280/806; 280/805; 297/472; 297/480
[58] Field of Search ................... 280/805, 806, 807; 60/632–638; 297/471, 472, 480; 92/34, 35

[56] References Cited

U.S. PATENT DOCUMENTS 3,528,344  9/1970  Rabenhorst .......................... 92/35
4,008,780  2/1977  Bendler et al. ..................... 297/480
4,258,934  3/1981  Tsuge et al. ........................ 280/806

*Primary Examiner*—Richard A. Bertsch
*Attorney, Agent, or Firm*—Cushman, Darby & Cushman

[57] ABSTRACT

A seat belt tensioning device for a vehicle comprises a fixed member fixed to a vehicle body, a movable member which is movable in the direction opposite to the fixed member, a bellow shaped flexible member, both ends of which are secured to the fixed member and the movable member to form a sealed chamber, a rod, one end of which is secured to the movable member, the other end of which is connected to a seat belt through the sealed chamber, and a guide member which is provided along the flexible member for guiding the elongation of the flexible member. One end of the guide member is airtightly fixed to the movable member and the other end of the guide member extends in the direction opposite to the movable member while airtightly and slidably contacted with the fixed member at an urgent time such as upon a vehicle impact, a high pressure gas is produced and is poured into the sealed chamber. Then, the flexible member which is usually contracted, is elongated due to the high gas pressure. Since the flexible member is connected to the guide member through the movable member, the guide member guides the elongation of the flexible member without generating any buckling deformation. Therefore, the seat belt which is connected to the movable member through the rod is certainly tensioned to restrain an occupant with safety.

14 Claims, 6 Drawing Figures

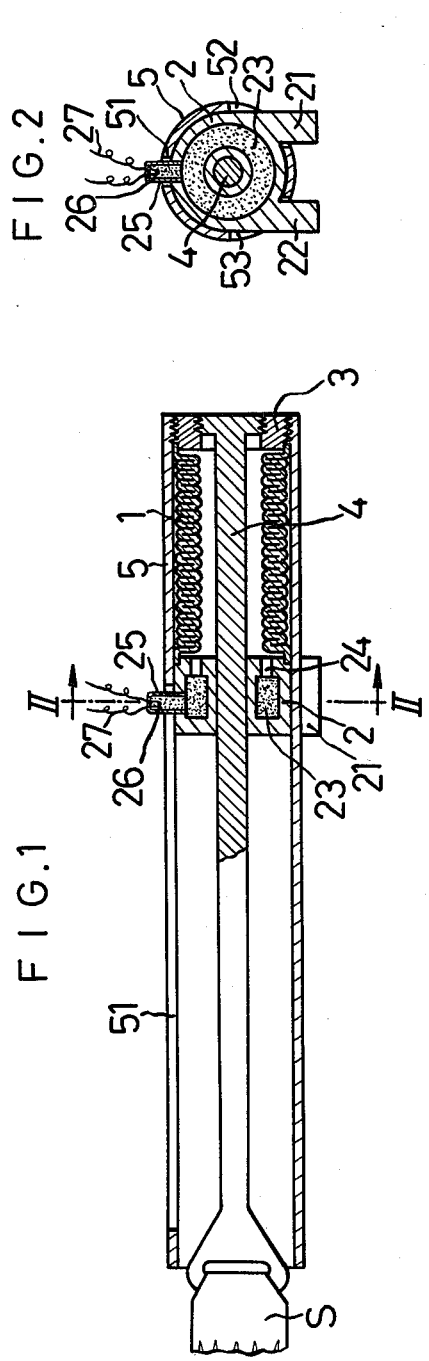
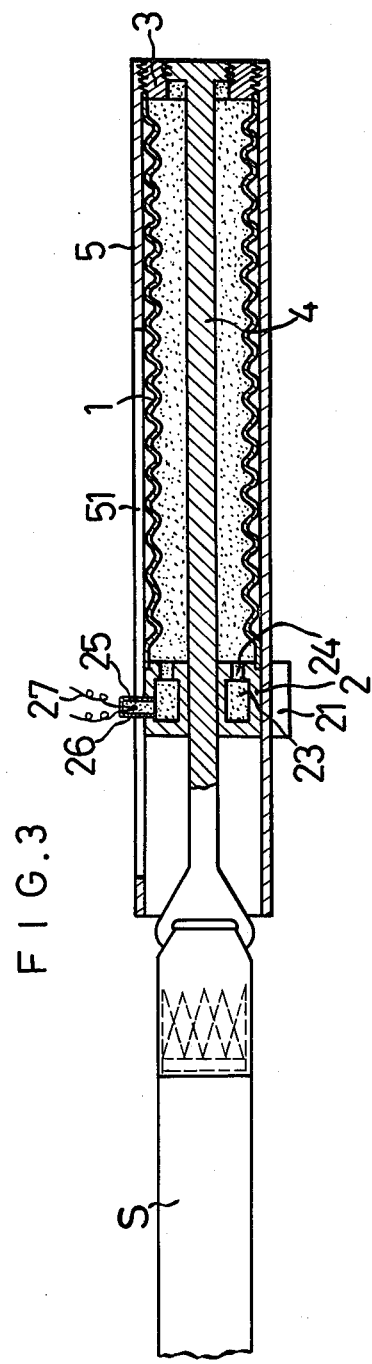

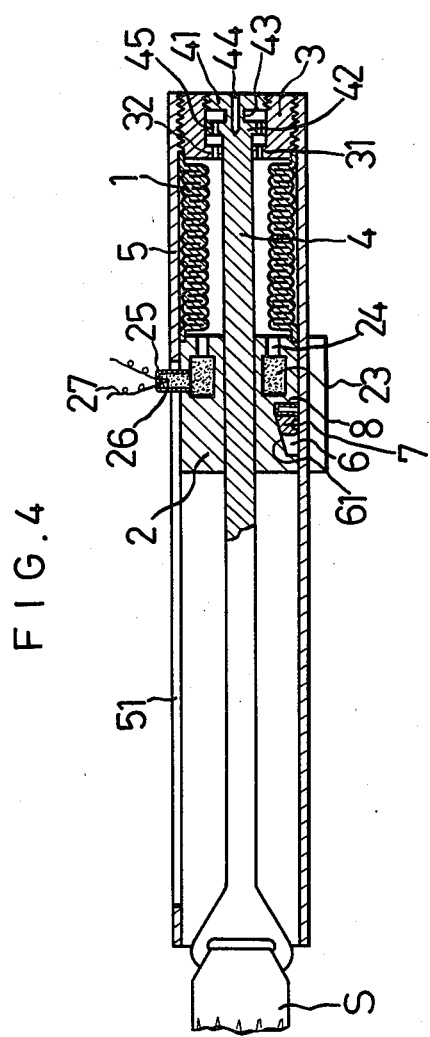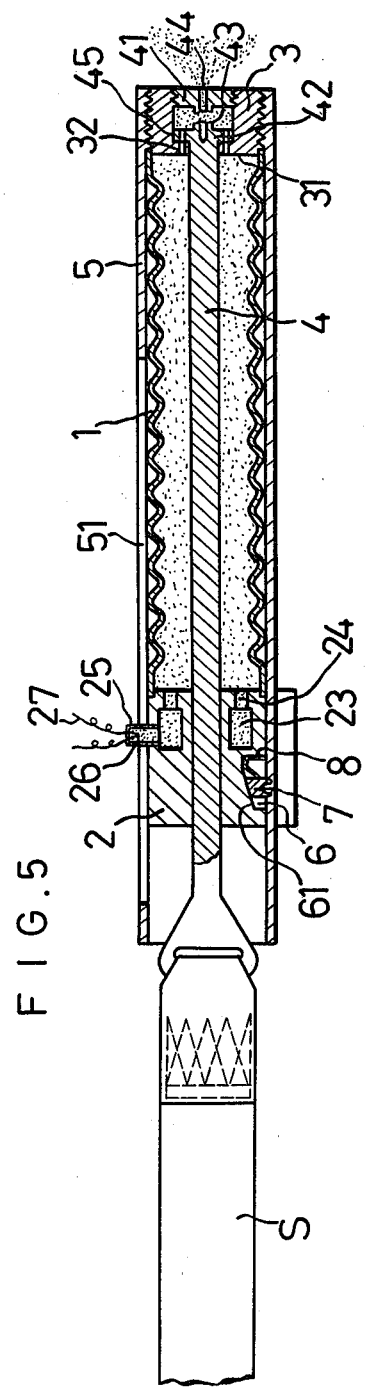
FIG.4
FIG.5

SEAT BELT TENSIONING DEVICE FOR VEHICLE

This application is a continuation-in-part of our copending application TSUGE et al., Ser. No. 20,045, filed Mar. 13, 1979, now U.S. Pat. No. 4,232,886, issued Nov. 11, 1980.

BACKGROUND OF THE INVENTION

The present invention relates to a seat belt tensioning device for a vehicle, etc. to protect a passenger or occupant at an urgent time such as upon an impact of the vehicle by restraining him by a tensioned seat belt.

Conventionally, a seat belt tensioning device of this general type is provided with a piston rod of which one end is connected to the seat belt, a piston which is connected to the piston rod, a cylinder for receiving the piston slidably therein and a driving means which operates the piston to slide relative to the cylinder at an urgent time. By means of the driving means, the piston is slid or moved within the cylinder to tension the seat belt.

However, in the conventional tensioning device having such a construction as described above, the cylinder is required to have enough length to obtain a piston stroke equal to the tensioning quantity or length desired for the seat belt. Furthermore, it is required to project the piston rod outside of the cylinder by a length equal to the piston stroke. Therefore, a space of at least two times as long as the tensioning length of the seat belt is necessary. Further, the space must be secured along one straight line. As a result, the conventional device cannot be easily installed in a limited space within a vehicle body.

From the above described circumstances, the present inventors have proposed a seat belt tensioning device in which a bellows shaped flexible body is employed in place of the conventional cylinder (U.S. patent application Ser. No. 20,045).

In the above described seat belt tensioning device, one end of the bellows shaped flexible body is connected to a fixed member while the other end thereof is connected to a movable member. And in the sealed chamber formed by the bellows shaped flexible body, the fixed body and the movable member, a seat belt or a rod member which is connected to the seat belt is inserted and connected to the movable member therein.

At an urgent time such as upon an impact of the vehicle, high pressure gas is supplied to the sealed chamber to elongate the flexible body. The movable member connected to the flexible body is moved together with the flexible member to tension the seat belt. Consequently, the occupant is restrained on his seat by the tensioned seat belt.

The present invention provides a seat belt tensioning device by which the device proposed by the inventors is improved furthermore.

Accordingly, one object of the present invention is to provide an improved seat belt tensioning device provided with a flexible member.

Another object of the present invention is to provide a seat belt tensioning device provided with means for elongating the flexible member into a predetermined direction and certainly operating to tension the seat belt.

Still another object of the present invention is to provide a seat belt tensioning device provided with means for limiting the tensioning force of the seat belt into a predetermined value and means for preventing the seat belt from returning, having excellent safety.

Further object of the present invention is to provide a small sized seat belt tensioning device in which the extending direction of the seat belt and the elongating direction of the flexible member can be freely selected as desired.

DESCRIPTION OF THE DRAWINGS

Other objects and advantages of the invention will become apparent from the following description of embodiments with reference to the accompanying drawings wherein:

FIGS. 1, 2 and 3 show a first embodiment of the present invention;

FIG. 1 is a longitudinal sectional view;

FIG. 2 is a sectional view taken along the line II—II of FIG. 1;

FIG. 3 is a longitudinal sectional view under operation;

FIG. 4 and FIG. 5 show a second embodiment of the present invention;

FIG. 4 is a longitudinal sectional view;

FIG. 5 is a longitudinal sectional view of the seat belt tensioning device under operation.

SUMMARY OF THE INVENTION

Figure 6:
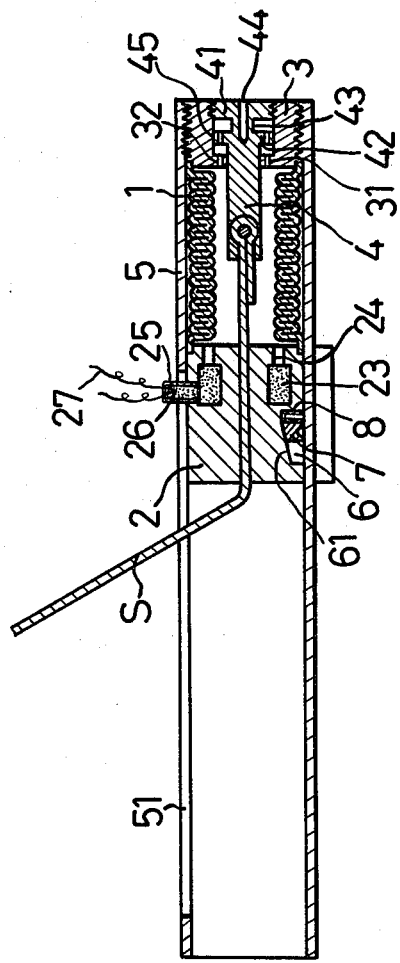
FIG. 6 is a longitudinal sectional view of a third embodiment of the present invention.

A selt belt tensioning device of the present invention comprises a fixed member fixed to a vehicle body, a movable member which is movable in the direction opposite to the fixed member, a bellows shaped flexible member, both ends of which are secured to the fixed member and the movable member to form a sealed chamber, a rod, one end of which is secured to the movable member, the other end of which is connected to a seat belt through the sealed chamber, and a guide member which is provided along the flexible member for guiding the elongation of the flexible member.

One end of the guide member is airtightly fixed to the movable member and the other end of the guide member extends in the direction opposite to the movable member while airtightly and slidably contacted with the fixed member at an ugent time such as upon a vehicle impact, a high pressure gas is produced and is poured into the sealed chamber. Then, the flexible member which is usually contracted, is elongated due to the high gas pressure. Since the flexible member is connected to the guide member through the movable member, the guide member guides the elongation of the flexible member without generating any buckling deformation. Therefore, the seat belt which is connected to the movable member through the rod is certainly tensioned to restrain an occupant safely.

DETAILED DESCRIPTION OF THE INVENTION

Hereinafter, the present invention will be explained in detail in accordance with the embodiments with reference to the accompanied drawings.

In a first embodiment shown in FIGS. 1, 2 and 3, a flexible bellows member 1 is formed of a thin walled steel plate into a bellows shape. And both ends of the flexible bellows member are connected to a fixed member 2 and a movable member 3 respectively.

The fixed member 2 is formed into a thick walled cylindrical shape and is provided with foot portions 21 and 22 by which the device is fixed to a vehicle body.

The movable member 3 is also formed into a thick walled cylindrical shape having the same outer diameter as that of the fixed member 2.

In the inner periphery and the outer periphery of the movable member 3, screw portions are formed.

Both ends of the flexible member 1 are joined to the outer peripheral edge portions of the fixed member 2 and the movable member 3 by welding or the like respectively.

And by the flexible member 1, the fixed member 2 and the movable member 3, a sealed chamber is formed. Within the fixed member 2, a rod 4 which is connected to the seat belt S, is slidably inserted in an air tight condition. One end of the rod 4 is screwed to the movable member 3 and the other end thereof which projects outside from the fixed member 2 is connected to the seat belt.

In the fixed member 2, an annular groove is formed as a powder chamber 23. The powder chamber 23 contains a propellant charge.

The powder chamber 23 and the inside of the flexible member 1 are communicated with each other through a plurality of passages 24.

In the upper portion of the fixed member 2, an ignition chamber 25 communicated with the powder chamber 23 is formed. Within the ignition chamber 25, a filament is disposed. The filament 26 is connected to an impact sensor (not shown) by means of a lead wire 27.

Outside the flexible member 1, the fixed member 2 and the movable member 3, a metallic cylindrical guide member 5 is disposed so as to cover them. The guide member 5 is extended towards the end of the rod 4 which is connected to the seat belt S. The guide member 5 is screwed to the outer periphery of the movable member 3 in one end thereof and is slidably contacted with the outer peripheral surface of the fixed member 2.

In the upper portion of the guide member 5, a long slot 51 is formed in the axial direction thereof from the position corresponding to the fixed member 2 to the end thereof near the seat belt S. From the long slot 51, the ignition chamber 25 is projected.

In the lower portion of the guide member 5, two long slots 52 and 53 are formed in the axial direction thereof in parallel with each other from the position corresponding to the fixed member 2 to the end thereof near the seat belt S. From the long slots 52 and 53, the foot portions 21 and 22 are projected. The guide member 5 is movable rightwards in FIG. 1 together with the movable member 3.

In the seat belt tensioning device having the above described structure, the flexible member 1 is usually contracted as shown in FIG. 1.

At an urgent time such as upon a vehicle impact, the impact sensor detects the shock due to the vehicle impact to apply electric current to the filament 26. And the propellant charged within the powder chamber 23 is ignited. And due to the explosion of the propellant, plenty of high pressure gas is produced. The high pressure gas pours into the inside of the flexible member 1 through the passages 24 to elongate the flexible member 1 rightwards as shown in FIG. 3.

Then, the movable member 3 and the rod 4 connected to the movable member 3 are moved rightwards to tension the seat belt S. As a result, the occupant is restrained on his seat by the tensioned seat belt S.

At this time, the guide member 5, of which one end is connected to the movable member 3 and which is slidably contacted with the fixed member is moved in the axial direction. The guide member 5 guides the flexible member 1 therealong.

Since the flexible member 1 is elongated along a straight line without generating any buckling deformation, the occupant can be certainly restrained by the tensioned seat belt S.

FIG. 4 and FIG. 5 show the second embodiment of the present invention. According to the seat belt tensioning device of the second embodiment, safety of the occupant is improved furthermore by adding a load limiting means for limiting the tension load of the seat belt upon the occupant and a stopper for preventing the seat belt from returning, to the device of the first embodiment.

Hereinafter, the second embodiment, particularly the difference from the first embodiment will be explained.

In the end of the rod 4, a first flange portion 41 and a second flange portion 42 are formed. The first flange portion 41 is screwed to the end of the inner peripheral surface of the movable member 3, and the second flange portion 42 is slidably contacted with the inner peripheral surface of the movable member 3. The first flange portion 41 and the second flange portion 42 are connected to each other by a connecting portion 43 having a smaller diameter than that of the rod 4. And in the connecting portion 43, a passage 44 is formed from the first flange portion 41 so as to penetrate the axial center of the connecting portion 43.

The connecting portion 43 is broken by a predetermined load when a tension force is applied to the rod 4 leftwards in FIG. 4. Therefore, the upper limit of the load applied to the seat belt S is determined due to the material and thickness of the connecting portion 43.

The other end of the inner periphery of the movable member 3 is formed into an inwardly directed stopper flange portion 31. And the rod 4 is slidably inserted within the stopper flange portion 31. In this flange portion 31 and the second flange portion 42, a plurality of passages 32 and 45 are penetrated therethrough respectively so as to be communicated with each other.

In the outer periphery of the fixed member 2, a plurality of grooves provided with a tapered surface 61 are perforated to form space chambers 6 between the fixed member 2 and the guide member 5.

Within each of the space chambers, a stopper member 7 having sharpened ends in the side of the guide member 5 and an inclined surface contacted with the tapered surface 61, and a spring plate 8 are accomodated. The spring plate 8 pushes the stopper member 7 to the direction of the seat belt S, namely towards the narrow portion of the space chamber 6.

The other parts of the seat belt tensioning device of the second embodiment is substantially equal to those of the first embodiment.

In the second embodiment, high pressure gas is produced due to the explosion of the propellant at an urgent time such as upon a vehicle impact.

The flexible member 1 is elongated due to the high gas pressure and the movable member 3 and the guid member 5 are moved.

When the movable member 3 is moved and the tension load of the seat belt S upon the occupant reaches a predetermined value, the connecting portion 43 connecting the first flange portion 41 and the second flange portion 42 of the rod 4 is broken as shown in FIG. 5.

Then, the gas filled within the inside of the flexible body 1 is released outside through the passages 32 of the movable member 3, the passages 45 of the second flange portion 42 and the passage 44 of the first flange portion 41.

As a result, the gas pressure within the flexible member 1 descends so that the flexible member 1 is not elongated farther.

Therefore, the occupant is not excessively restrained by the tensioned seat belt S.

And after the connecting portion 43 is broken, the second flange portion 42 of the rod 4 is engaged with the stopper flange portion 31 of the movable member 3. Therefore, the rod 4 is prevented from coming out from the movable member 3.

However, it is difficult for the flexible member 1 to tolerate the tension force of the seat belt S applied after the connecting portion 43 is broken. So, the rod 4 is about to return leftwards in FIG. 5 together with the guide member 5, while contracting the flexible member 1.

At this time, the stopper members 7 pushed by the spring plate 8 is moved leftwards along the tapered surface 61 and the sharpened ends thereof are cut into the cover member 5.

Therefore, the rod 4 is prevented from returning so that the tension force of the seat belt S is kept at a predetermined value.

It is very difficult to control the elongating length of the flexible member, namely the tension load of the seat belt into a predetermined value by gas pressure. If the tension load of the seat belt is too small, the device does not operate sufficiently. And if the tension load is too large, the occupant is in danger of being injured by the excessibly tensioned seat belt.

According to the seat belt tensioning device of the present invention, the tension load can be controlled to a predetermined value certainly.

FIG. 6 shows the third embodiment of the present invention.

In the third embodiment, the rod 4 is shortened compared with that of the first and the second embodiments and is connected to one end of the seat belt S within the flexible member 1. And the other end of the seat belt S is taken out from the long slot 51 formed in the guide member 5 to restrain the occupant.

According to the third embodiment, the correlation of the extending direction of the seat belt S to the elongating direction of the seat belt tensioning device can be freely selected as desired. Therefore, the seat belt tensioning device can be positioned in an arbitrary place within the vehicle.

Other parts and other operations of the third embodiment are similar to those of the first and the second embodiment.

In the above described embodiments, propellant is used as the means for elongating the flexible member. Other means of producing high pressure gas or a spring member can be also employed.

As the load limiting means, other member which is broken or deformed by shearing force, bending force or the like can be employed in place of the connecting portion which is broken by tension force.

The stopper members for preventing the seat belt from returning can be modified into steel balls or can be modified so as to cut into the rod.

The flexible member can be made of material having lower hardness than that of metal since the elongating direction thereof is guided by the guide member.

For example, the flexible member can be made of rubber or synthetic resin having heat resistance and pressure resistance.

And the guide member need not be shaped into a cylindrical body which covers the whole outer periphery of the flexible member. For example, another type of the guide member can be made by disposing a plurality of rods along the outer periphery of the flexible member in the axial direction thereof in parallel with each other and connecting these rods by a plurality of ring members.

As described above, in the seat belt tensioning device of the present invention, the flexible member which can be elongated due to the gas pressure or the like is employed.

Therefore, the seat belt tensioning device can be made small.

And since the guide member is provided for guiding the elongation of the flexible member therealong, the flexible member is not buckled when it is elongated. Therefore, the seat belt can be tensioned more certainly.

And by providing the load limiting means for limiting the tension load of the seat belt and the stopper means for preventing the seat belt from returning, the occupant is prevented from being injured by the excessively tensioned seat belt and is also prevented from the secondary impact due to the returning of the seat belt.

Furthermore, by taking out the seat belt from the slot formed in the cylindrical side wall of the guide member, the correlation of the extending direction of the seat belt to the moving direction of the rod can be freely selected.

Therefore, the seat belt tensioning device can be positioned in a limited space within the vehicle body.

Having now fully described the invention, it will be apparent to one of ordinary skill in the art that many changes and modifications can be made thereto without departing from the spirit or scope of the invention as set forth herein.

What is claimed is:

1. A seat belt tensioning device for a vehicle, comprising:
   a fixed member adapted to be fixed to a vehicle body;
   a movable member disposed so as to be moved in a direction away from said fixed member;
   an elongatable flexible member which is usually in a contracted state, opposite ends of which are secured to said fixed member and said movable member respectively to form a sealed chamber therebetween;
   a connecting member, one end of which is engaged with said movable member so as to move therewith, and the other end of which is connectable to a selt belt;
   a guide member for guiding the elongation of said flexible member therealong; said guide member being disposed along said flexible member, one end of said guide member being fixed to said movable member, said guide member being slidable relative to said fixed member together with said movable member; and
   gas supplying means for supplying high pressure gas into said sealed chamber to elongate said flexible member at an urgent time.

2. A seat belt tensioning device for a vehicle, comprising:
a fixed member adapted to be fixed to a vehicle body;
a flexible member which is usually in a contracted state and elongates at an urgent time, one end of which is secured to said fixed member;
a movable member to which the other end of said flexible member is secured and which is movable in a direction away from said fixed member together with said flexible member;
said fixed member, said flexible member and said movable member forming a sealed chamber defined thereby;
a connecting member, one end of which is engaged with said movable member so as to move therewith, and the other end of which extends within said sealed chamber in the elongating direction of said flexible member and is connectable to a seat belt within or outside of said sealed chamber;
a guide member for guiding the elongation of said flexible member therealong, said guide member being disposed along said flexible member, one end of said guide member being fixed to said movable member, said guide member being slidable relative to said fixed member together with said movable member; and
gas supplying means for supplying high pressure gas into said sealed chamber to elongate said flexible member at an urgent time.

3. A seat belt tensioning device according to claim 1 or 2, wherein:
said fixed member is an annular body having an axial through hole;
said movable member is a circular body;
said movable member has the same outer diameter as that of said fixed member; and
said connecting means includes a rod.

4. A seat belt tensioning device according to claim 3, wherein:
said guide member is a metallic cylindrical body, of which one end is airtightly fixed to the outer periphery of said movable member, and of which the other end extends into the direction opposite to said movable member by a length required for tensioning said seat belt.

5. A seat belt tensioning device according to claim 4, wherein:
said flexible member shapes like a bellow;
said flexible member is fixed to the outer periphery of said movable member airtightly; and
one end of said rod is engaged with the inner periphery of said movable member.

6. A seat belt tensioning device according to claim 4, wherein:
said rod extends through said axial through hole of said fixed member airtightly and is connected to said seat belt outside said guide member.

7. A seat belt tensioning device according to claim 4, wherein:
said gas supplying means comprises:
an impact sensor for detecting a shock at an urgent time such as an impact of a vehicle and producing electric signals;
an ignition chamber wherein an ignition means electrically connected to said impact sensor is disposed; and
a powder chamber containing propellant to be ignited by said ignition means;
said ingition chamber and said powder chamber being disposed within said fixed member so that said powder chamber is communicated with said sealed chamber.

8. A seat belt tensioning device according to claim 7, wherein:
said guide member is provided with a long slot extending in the direction opposite to said movable member from said fixed member;
said fixed member is provided with a projecting portion in the upper portion thereof; and
said projecting portion is projected from said long slot.

9. A seat belt tensioning device according to claim 8, wherein:
said rod is connected to said seat belt within said sealed chamber in a state where said flexible member is contracted and said seat belt extends outside through said axial through hole of said fixed member airtightly and through said long slot of said guide member.

10. A seat belt tensioning device according to claim 5, wherein:
said flexible member is made of a steel plate.

11. A seat belt tensioning device according to claim 5, wherein:
said flexible member is made of rubber or synthetic resin.

12. A seat belt tensioning device according to claim 3, further comprises:
a load limiting means which is disposed between said rod and said movable member and which is broken by a predetermined load applied to said seat belt; and
a stopper means which is disposed within said fixed member for preventing said guide member and said rod which are moved with the elongated flexible member at an urgent time, from returning due to the seat belt tension force.

13. A seat belt tensioning device according to claim 12, wherein:
said movable member has an axial through hole wherein one end of said rod is inserted;
said load limiting means is integrally formed in said one end of said rod;
said load limiting means includes a first flange portion radially projecting from said one end of said rod, a second flange portion radially projecting from said rod at a short distance from said first flange portion, a connecting portion connecting said first and said second flange portion and a stopper flange portion inwardly directed from said movable member so as to be engaged with said second flange portion;
said first flange portion is fixed to the inner periphery of said movable member and said second flange portion is slidably contacted therewith;
said connecting portion has a smaller diameter than that of said rod and is provided with an inner passage which axially extends from said first flange portion to said second portion;
said second flange portion and said stopper flange portion have a plurality of passages so as to be communicated with each other for releasing the gas within said sealed chamber outside through said passage of said connecting portion when said connecting portion is broken.

14. A seat belt tensioning device according to claim 13, wherein:

said stopper means is disposed in the outer periphery of said fixed member;

said stopper means comprises a plurality of grooves having a tapered surface inclined outwardly in the direction opposite to said movable member respectively, a stopper member having sharpened ends directing outwardly, which is pushed by said tapered surface of each of said grooves against said guide member within each of said grooves, and a spring plate which is accommodated within each of said grooves for pushing said stopper member in the direction opposite to said movable member.

* * * * *